United States Patent
Suzuki et al.

(10) Patent No.: US 11,628,567 B2
(45) Date of Patent: Apr. 18, 2023

(54) OBSTACLE SEARCH DEVICE OF ROBOT SYSTEM

(71) Applicant: FANUC CORPORATION, Yamanashi (JP)

(72) Inventors: Youhei Suzuki, Yamanashi (JP); Tatsuya Oumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 328 days.

(21) Appl. No.: 16/889,021

(22) Filed: Jun. 1, 2020

(65) Prior Publication Data

US 2020/0384646 A1    Dec. 10, 2020

(30) Foreign Application Priority Data

Jun. 7, 2019 (JP) .............................. JP2019-107097

(51) Int. Cl.
*B25J 9/16* (2006.01)
*B25J 19/02* (2006.01)

(52) U.S. Cl.
CPC ........... *B25J 9/1666* (2013.01); *B25J 9/1676* (2013.01); *B25J 19/02* (2013.01); *B25J 9/1697* (2013.01)

(58) Field of Classification Search
CPC ...... B25J 9/1664; B25J 9/1666; B25J 9/1676; B25J 9/1694; B25J 9/1697; B25J 19/02–026; G05B 2219/40455; G05B 2219/40476; G05B 2219/40478; G05B 2219/40425

See application file for complete search history.

(56) References Cited

U.S. PATENT DOCUMENTS

2014/0365010 A1* 12/2014 Yasuda ................. G06V 20/64
                                                                      348/91

FOREIGN PATENT DOCUMENTS

| JP | 2008-087074 A | 4/2008 |
| JP | 2010-094777 A | 4/2010 |
| JP | 2010-142910 A | 7/2010 |
| JP | 2013-244566 A | 12/2013 |
| JP | 2017-016359 A | 1/2017 |
| JP | 2018-094639 A | 6/2018 |

OTHER PUBLICATIONS

Fisher et al., "A next-best-view algorithm for 3D scene recovery with 5 degrees of freedom", 1999, British Machine Vision Conference (BMVC) 99, pp. 163-172 (Year: 1999).*

* cited by examiner

*Primary Examiner* — Spencer D Patton
(74) *Attorney, Agent, or Firm* — Studebaker & Brackett PC

(57) ABSTRACT

Provided is an obstacle search device of a robot system, capable of creating a robot operation path in which it is not necessary to input information manually, human errors are eliminated, and the robot does not interfere with an obstacle efficiently and accurately. An obstacle search device of a robot system, for automatically specifying a region where an obstacle is present so that an operation path in which a robot does not interfere with an obstacle can be generated automatically includes: a non-contact three-dimensional measuring unit attached to the robot; and an obstacle search unit that searches for an obstacle in a search space using the three-dimensional measuring unit.

2 Claims, 5 Drawing Sheets

OBSTACLE SEARCH DEVICE OF ROBOT SYSTEM

This application is based on and claims the benefit of priority from Japanese Patent Application No. 2019-107097, filed on 7 Jun. 2019, the content of which is incorporated herein by reference.

BACKGROUND OF THE INVENTION

Field of the Invention

The present invention relates to an obstacle search device of a robot system.

Related Art

Conventionally, in order to drive a robot such as an industrial robot, for example, a technique of automatically generating an operation path so that the robot does not interfere with obstacles on the basis of obstacle information is used.

Patent Document 1 discloses a robot system which includes a robot having a plurality of joints and having an end effector attached to a distal end thereof, a robot controller including a teaching data storage unit that stores teaching data for the robot and a work program, a command generation unit that generates an operation command for the robot on the basis of the work program, and a servo control unit that drives a servo motor of each joint of the robot according to the operation command, and a teaching device connected to the robot controller and in which the robot system performs an operation of gripping a work disposed at a first prescribed position so as to be fitted to a second prescribed position using the end effector, and the robot controller includes an attitude calculation unit that generates a work program for avoiding an obstacle to perform a fitting operation on the basis of positions including a work gripping point and a fitting point taught temporarily and an intermediate point between the work gripping point and the fitting point, an attitude of the end effector at the work gripping point and the fitting point, and the position of an obstacle present around the robot and storing the work program in the teaching data storage unit.

Patent Document 2 discloses a remote control support device including a three-dimensional recognition unit that three-dimensionally recognizes a target object on the basis of point group data measured by a three-dimensional measuring device and specifies a shape, a position, and an attitude of the target object, a target object model representation unit that generates a target object model representation reflecting the shape, position, and attitude of the target object specified by the three-dimensional recognition unit, a display unit that displays the target object model representation generated by the target object model representation unit, a robot operation sequence instruction unit that specifies an operation target model to be operated by a robot from the target object model displayed on the display unit on the basis of instruction information from the outside and generates an operation sequence of the robot, of the operation target model, and a robot operation sequence determining unit that determines an operation sequence of the robot, avoiding an obstacle on the basis of the operation sequence instructed by the robot operation sequence instruction unit and outputs the determined operation sequence to the display unit.

Patent Document 1: Japanese Unexamined Patent Application, Publication No. 2010-142910
Patent Document 2: Japanese Unexamined Patent Application, Publication No. 2010-94777

SUMMARY OF THE INVENTION

However, in the method disclosed in Patent Document 1, since it is necessary to prepare obstacle information in advance and manually input the same to an operation path generation device, an inputting effort incurs whenever obstacle information is updated. Moreover, when information is input erroneously, the robot may interfere with an obstacle. In the method disclosed in Patent Document 2, it is necessary to search spaces including a space having been searched again whenever an operating range of a robot changes.

An aspect of an obstacle search device of a robot system according to the present disclosure is a device for automatically specifying a region where an obstacle is present so that an operation path in which a robot does not interfere with an obstacle can be generated automatically, the device including: a non-contact three-dimensional measuring unit attached to the robot; and an obstacle search unit that searches for an obstacle in a search space using the three-dimensional measuring unit.

According to an aspect of the obstacle search device of the robot system according to the present disclosure, a non-contact three-dimensional measuring unit (a three-dimensional measuring device) is attached to a robot and an obstacle is searched for using the three-dimensional measuring unit.

In this way, it is possible to automatically and freely change the position and attitude of the three-dimensional measuring device by moving the robot and search a wide range of the space efficiently and effectively. Moreover, since a blind spot is unlikely to occur, it is possible to realize an operation of sneaking into the gap between obstacles and specify a region where the obstacle is not present efficiently, accurately, and effectively.

Therefore, since a search result is output to and reflected on an operation path generation device, it is not necessary to input information manually unlike the conventional technique, human errors are eliminated, and it is possible to create and realize an operation path of the robot in which the robot does not interfere with the obstacle efficiently and accurately.

DETAILED DESCRIPTION OF THE INVENTION

Hereinafter, an obstacle search device of a robot system according to an embodiment will be described with reference to FIGS. 1 to 7. The present embodiment relates to a device that automatically specifies a region where an obstacle is present when driving an industrial robot, for example, so that an operation path in which the robot does not interfere with an obstacle can be generated automatically.

Figure 1:
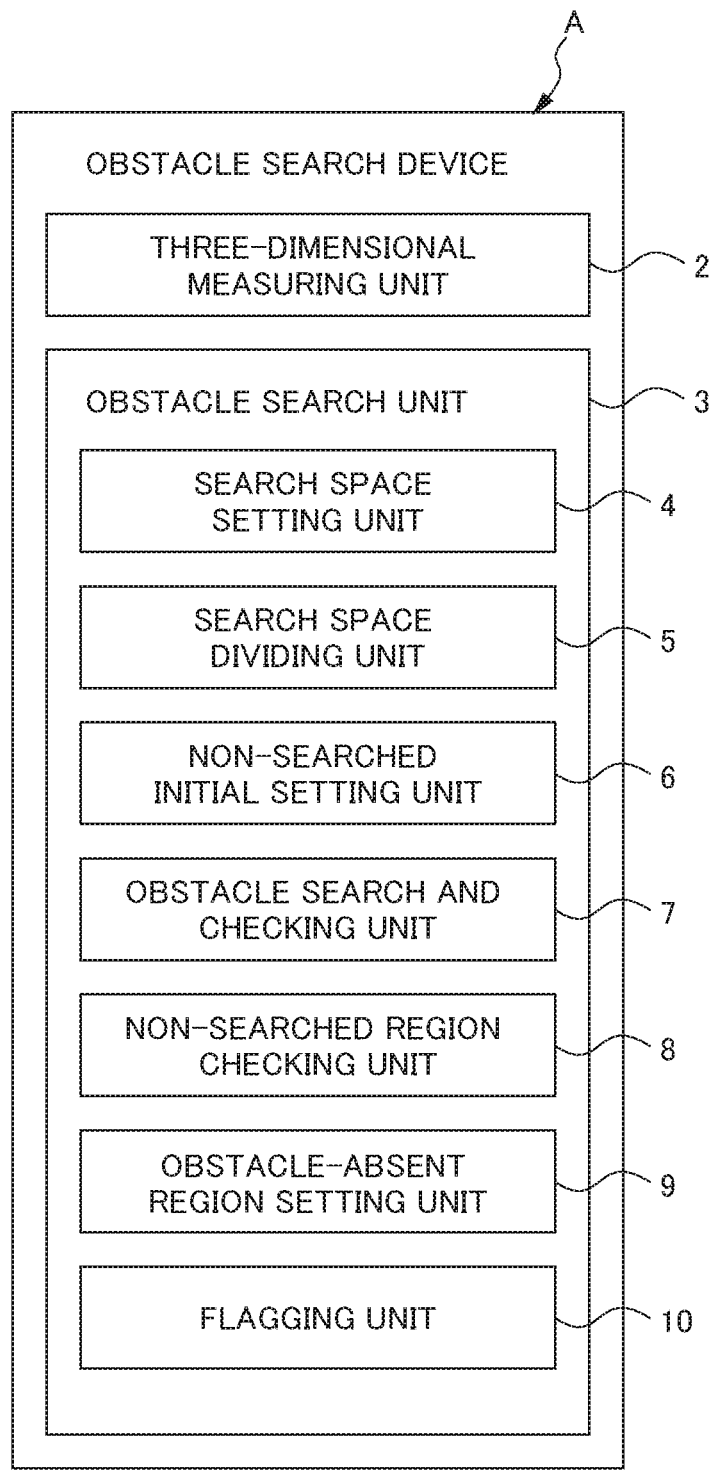
FIG. 1 is a block diagram illustrating an obstacle search device of a robot system according to an aspect.

As illustrated in FIG. 1 (and FIG. 3), an obstacle search device A of a robot system according to the present embodiment includes a non-contact three-dimensional measuring device (a three-dimensional measuring unit) 2 attached to a robot 1 and an obstacle search unit 3 that searches for an obstacle M in a search space R using the three-dimensional measuring device 2.

As illustrated in FIG. 1 (and FIG. 4), the obstacle search unit 3 includes a search space setting unit 4 that sets a prescribed space as a search space R, a search space dividing unit 5 that divides the search space R set by the search space setting unit 4 into cube regions R1 having a prescribed size, and a non-searched initial setting unit 6 (a flagging unit 10) that sets all cube regions R1 in the search space R divided by the search space dividing unit 5 as "non-searched" and illustrates a setting result in such a way that a flag is set in a management list or the like.

Furthermore, as illustrated in FIG. 1 (and FIGS. 5, 6, and 7), the obstacle search unit 3 includes an obstacle search and checking unit 7 that checks the presence of an obstacle M in the cube region R1 in the search space R while moving the robot 1 to update the position and attitude of the three-dimensional measuring device 2, a non-searched region checking unit 8 that checks the presence of a non-searched cube region R1 with respect to all cube regions R1 other than the cube region R1 in which it is determined by the obstacle search and checking unit 7 that measurement is not possible, and an obstacle-absent region setting unit 9 (the flagging unit 10) that sets a cube region R1 (R3) where the obstacle M is not present as "obstacle absent" and illustrates a setting result in such a way that a flag is set in a management list or the like.

A method of automatically specifying a region R2 where the obstacle M is present using the obstacle search device A of the robot system according to the present embodiment will be described.

Figure 2:
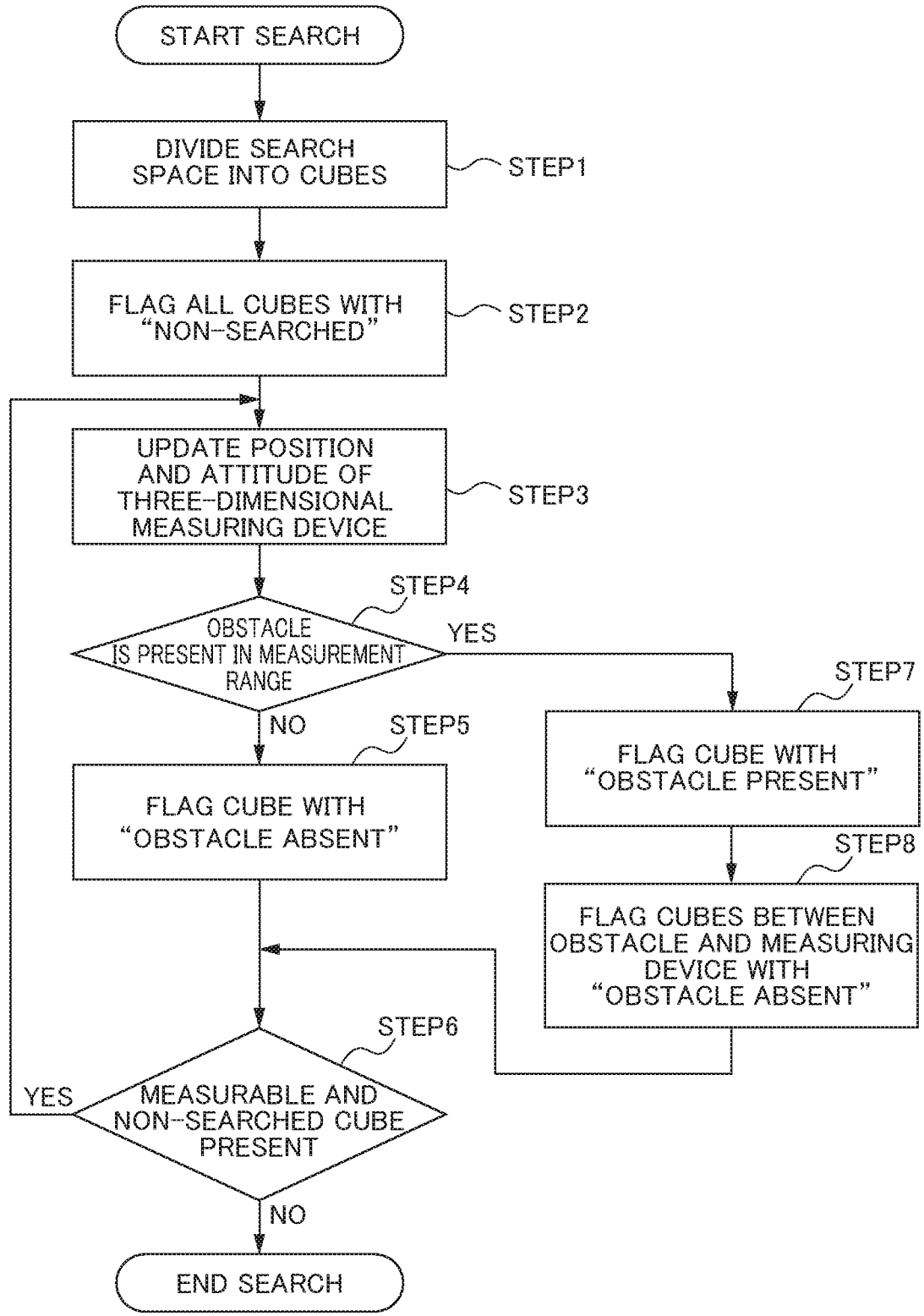
FIG. 2 is a flowchart illustrating a method of specifying a region in which a robot does not interfere with an obstacle using the obstacle search device of the robot system according to an aspect.
Figure 3:
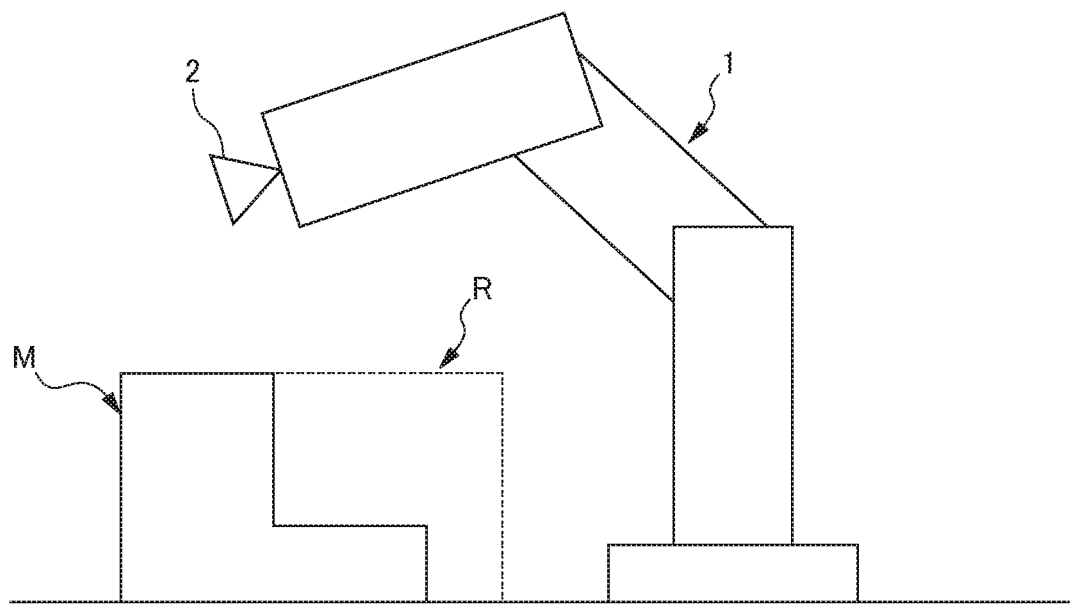
FIG. 3 is a diagram illustrating a state in which a search region is set when specifying a region in which a robot does not interfere with an obstacle using the obstacle search device of the robot system according to an aspect.

First, as illustrated in FIGS. 2 and 3 (FIG. 1), a non-contact three-dimensional measuring device (a three-dimensional measuring unit) 2 such as a laser scanner is attached to the robot 1, and the position and attitude of the three-dimensional measuring device 2 are changed by moving the robot 1 so that the obstacle M can be searched for automatically.

Figure 4:
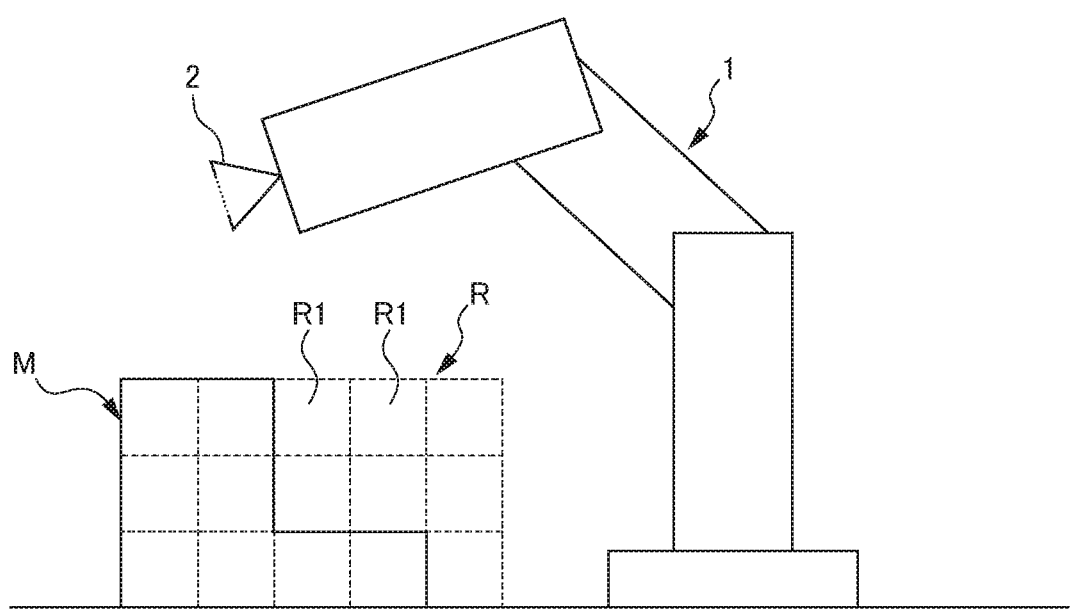
FIG. 4 is a diagram illustrating a state in which a search region is divided when specifying a region in which a robot does not interfere with an obstacle using the obstacle search device of the robot system according to an aspect.

Subsequently, as illustrated in FIGS. 2 and 4 (FIG. 1), the search space setting unit 4 sets a prescribed space in which the robot 1 can move as a search space R, and the search space dividing unit 5 divides the search space R set by the search space setting unit 4 into cube regions R1 having a prescribed size (STEP 1).

Subsequently, the non-searched initial setting unit 6 (the flagging unit 10) sets all cube regions R1 in the search space R divided by the search space dividing unit 5 as "non-searched" and illustrates a setting result in such a way that a flag is set in a management list or the like (STEP 2).

Figure 5:
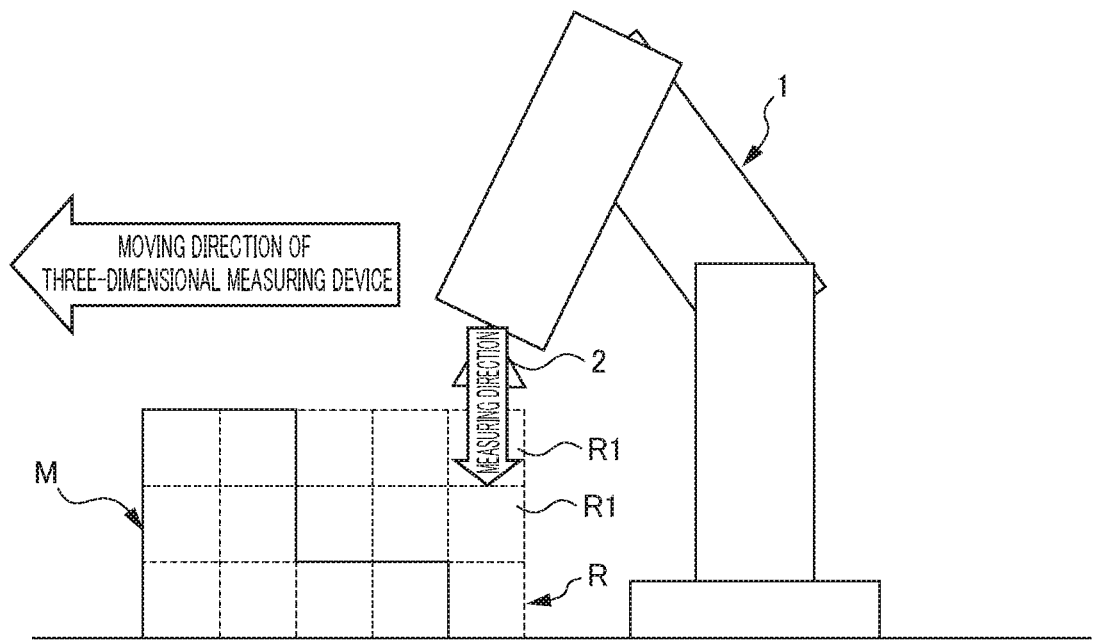
FIG. 5 is a diagram illustrating a state in which an obstacle is searched for using the obstacle search device of the robot system according to an aspect.
Figure 6:
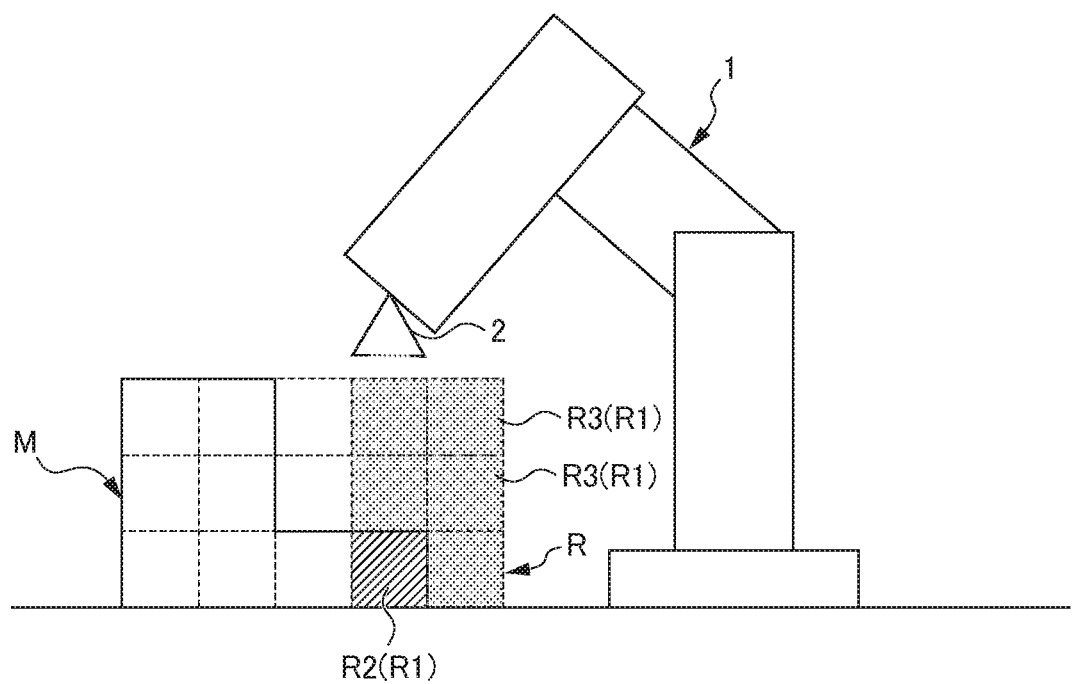
FIG. 6 is a diagram illustrating a state in which an obstacle is searched for using the obstacle search device of the robot system according to an aspect and the presence of an obstacle in a divided region is specified.
Figure 7:
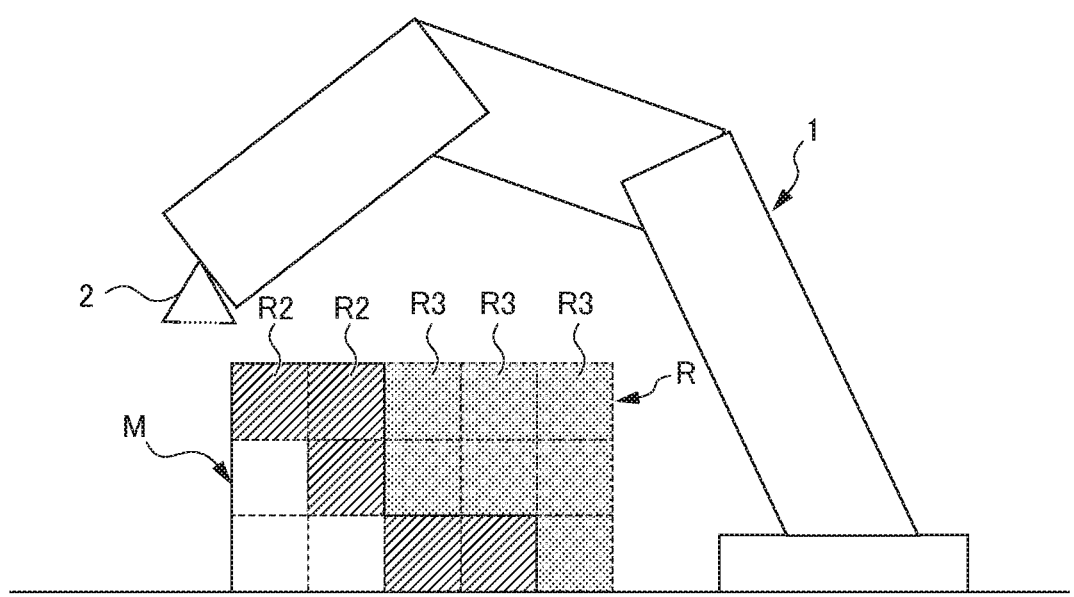
FIG. 7 is a diagram illustrating a state in which an obstacle is searched for using the obstacle search device of the robot system according to an aspect and the presence of an obstacle in a divided region is specified.

Subsequently, as illustrated in FIGS. 2 and 5 (FIG. 1), the obstacle search and checking unit 7 updates the position and attitude of the three-dimensional measuring device 2 while moving the robot 1 and checks the presence of the obstacle M in the search space R (STEP 3 and STEP 4).

When the obstacle M is not present in the cube region R1 in a measurement range, the obstacle-absent region setting unit 9 (the flagging unit 10) sets and specifies the cube region R1 (R3) as "obstacle absent" and illustrates a setting result in such a way that a flag is set in a management list or the like (STEP 5).

Moreover, the non-searched region checking unit 8 checks whether a measurable and non-searched cube region R1 is present (STEP 6), and the search ends when the measurable and non-searched cube region R1 is not present.

On the other hand, when the obstacle M is present in the cube region R1 in the measurement range, the cube region R1 (R2) where the obstacle M is present is set as "obstacle present", and a setting result is illustrated in such a way that a flag is set in a management list or the like. Moreover, a cube region R1 (R3) between the three-dimensional measuring device 2 and the cube region R1 (R2) where the obstacle M is present is set/specified as "obstacle absent", and a setting/specifying result is illustrated in such a way that a flag is set in a management list or the like (STEP 8).

Subsequently, the non-searched region checking unit 8 checks whether a measurable and non-searched cube region R1 is present (STEP 6), and when the measurable and non-searched cube region R1 is present, the obstacle search and checking unit 7 updates the position and attitude of the three-dimensional measuring device 2 while moving the robot 1 and continues checking the presence of the obstacle M in the search space R (STEPS 3 and 4), and operations similar to the above-described operations are performed repeatedly.

The non-searched region checking unit 8 checks whether a measurable and non-searched cube region R1 is present (STEP 6), and when the measurable and non-searched cube region R1 is not present, the search operation ends.

In the obstacle search device A of the robot system according to the present embodiment having the above-described configuration, first, the non-contact three-dimensional measuring device 2 is attached to the robot 1, and the obstacle M is searched for using the three-dimensional measuring device 2.

In this way, it is possible to automatically and freely change the position and attitude of the three-dimensional measuring device 2 by moving the robot 1 and search a wide range of the space efficiently and effectively. Moreover, since a blind spot is unlikely to occur, it is possible to realize an operation of sneaking into the gap between obstacles M and specify a region R3 where the obstacle M is not present efficiently, accurately, and effectively.

Therefore, according to the obstacle search device A of the robot system according to the present embodiment, since a search result is output to and reflected on an operation path generation device, it is not necessary to input information manually unlike the conventional technique, human errors are eliminated, and it is possible to create and realize an operation path of the robot 1 in which the robot does not interfere with the obstacle M efficiently and accurately. Furthermore, when the search space R is expanded due to change in operating range of the robot after search, it is possible to search efficiently spaces without overlaps using the search results for the respective cube regions R1 obtained in the previous search.

In the obstacle search device A of the robot system according to the present embodiment, since an arbitrary search space R is divided into cube regions R1 on the basis of an arbitrary resolution and the cube region is used as a search unit, the size of the cube region R1 can be reduced and the number of cube regions can be increased as the resolution increases. As a result, it is possible to set search accuracy freely as necessary and create and realize an operation path of the robot 1 in which the robot does not interfere with the obstacle M efficiently and effectively.

While an embodiment of the obstacle search device of the robot system has been described, the present invention is not limited to the above-described embodiment and can be changed appropriately without departing from the spirit thereof.

For example, although the search space R is divided into a plurality of cube regions R1 in the present embodiment, the divided region may not necessarily be a cube.

EXPLANATION OF REFERENCE NUMERALS

1: Robot
2: Three-dimensional measuring device (three-dimensional measuring unit)
3: Obstacle search unit
4: Search space setting unit
5: Search space dividing unit
6: Non-searched initial setting unit
7: Obstacle search and checking unit
8: Non-searched region checking unit
9: Obstacle-absent region setting unit
10: Flagging unit
A: Obstacle search device of robot system
M: Obstacle
R: Search space
R1: cube region (divided region)
R2: cube region (divided region) where obstacle is present
R3: cube region (divided region) where obstacle is not present

What is claimed is:

1. An obstacle search device of a robot system, for automatically specifying a region where an obstacle is present so that an operation path in which a robot does not interfere with an obstacle can be generated automatically, the device comprising:
   a non-contact three-dimensional measuring device attached to the robot; and
   a processor, the processor being configured to:
   set a search space;
   divide the search space into a plurality of regions having a prescribed size;
   search for an obstacle in the search space using the three-dimensional measuring device while the three-dimensional measuring device is positioned outside the search space and while moving the robot to update a position and attitude of the three-dimensional measuring device; and
   automatically generate the operation path for manipulating the robot based on the searched obstacle.

2. The obstacle search device of the robot system according to claim 1, wherein the processor initially
   sets all divided regions as "non-searched"; and
   checks presence of a non-searched region with respect to measurable regions.

* * * * *